Patented May 27, 1952

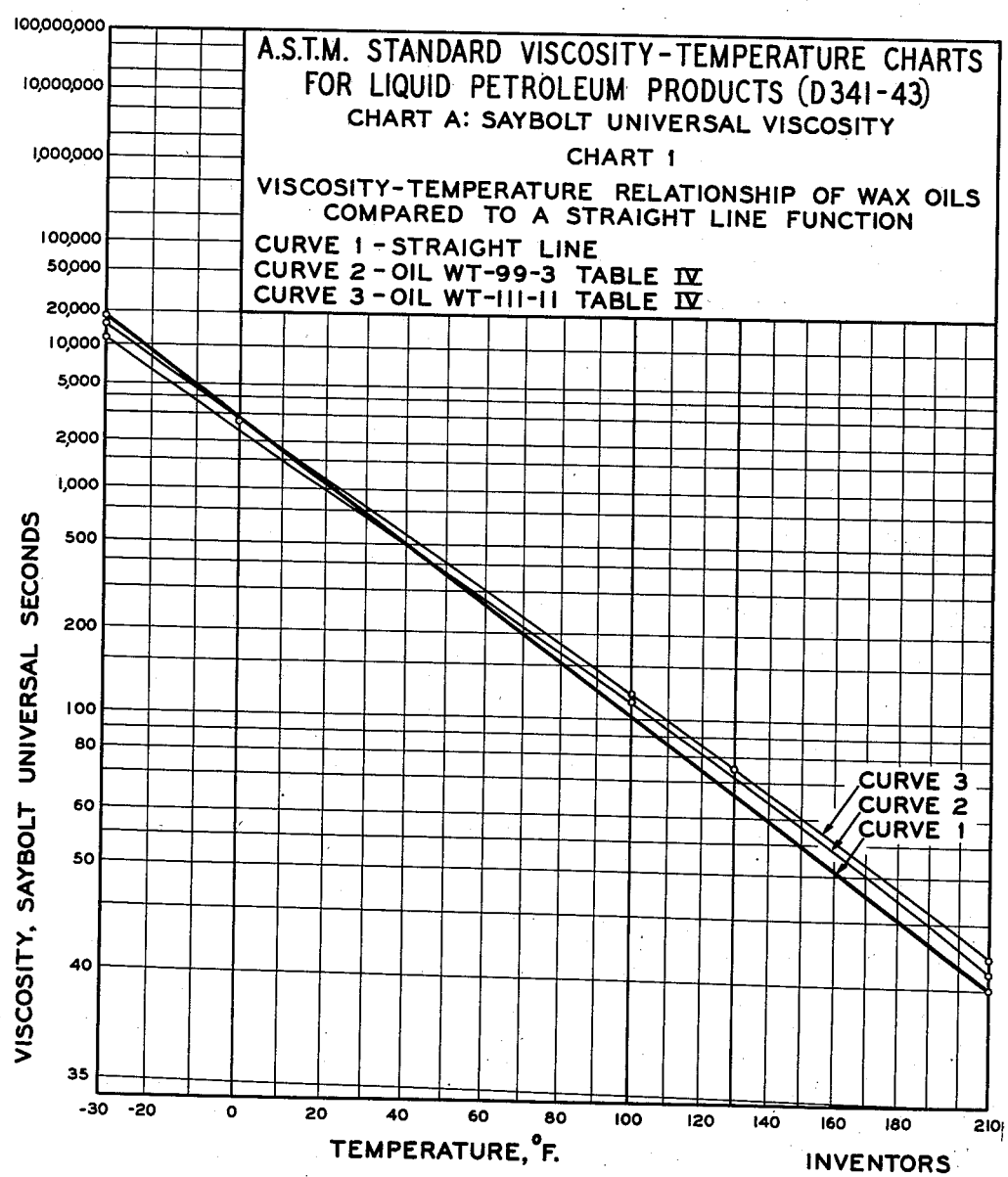

2,597,910

UNITED STATES PATENT OFFICE 2,597,910

PRODUCTION OF LUBRICATING OIL
FROM WAX

Wallace M. Thaw, San Pablo, and Harold R. Stewart, Point Reyes Station, Calif., assignors to California Research Corporation, San Francisco, Calif., a corporation of Delaware Application February 28, 1950, Serial No. 146,909

4 Claims. (Cl. 196—78)

This invention relates to hydrocarbon lubricating oils characterized by extremely high viscosity indices and to a process for the production of such oils from petroleum waxes.

The oils of this invention are produced by chlorinating a petroleum wax, dehydrochlorinating at least a part of the product of the chlorination step under conditions adapted to produce a relatively saturated oil, and dewaxing the oil to separate unreacted wax from the product oil. The properties of the oil are critically related to the degree of chlorination of the chlorinated wax charged to the dehydrochlorination step, and to the reaction conditions and catalyst employed in the dehydrochlorination step. The oils produced are of complex chemical composition and cannot be defined in terms of the amounts of specific compounds of which they are composed but must rather be defined in terms of the process by which they are produced.

In the past, lubricating oils have been prepared from petroleum waxes by processes including steps of chlorination and dehydrochlorination but the products of these processes have been characterized by a high degree of unsaturation and by high Conradson carbon values. In the past it has been considered that the production of these oils could be effected equally as well at a wide range of chlorination levels and the dehydrochlorination step has been conducted at relatively low temperatures with the result that the product was highly unsaturated even when prolonged processing periods were employed. The oils prepared in the past have been characterized by instability and by a tendency to lay down heavy engine deposits during engine operation; they have not been produced commercially.

It is the primary object of this invention to produce from petroleum waxes a substantially saturated hydrocarbon oil characterized by a high viscosity index, by a low Conradson carbon value, and by clean operation when employed in internal combustion engines as a lubricant.

It is a further object of this invention to produce from petroleum waxes a substantially saturated hydrocarbon oil characterized by a low pour point and well adapted to use in internal combustion engines operated intermittently under low temperature conditions.

It has now been found that hydrocarbon oils of very high viscosity index, low bromine number, and low Conradson carbon value may be produced by contacting a chlorinated petroleum wax consisting predominantly of monochlorinated wax molecules with a silica-alumina catalyst at an elevated temperature in excess of 550° F., but below the temperature at which appreciable cracking occurs and preferably in the range 575 to 725° F. for a time sufficient to remove substantially all of the chlorine from the chlorinated wax as hydrogen chloride and to produce a substantially saturated oil. The chlorinated wax consisting predominantly of monochlorinated wax molecules is suitably prepared either by controlled chlorination of the wax to produce a chlorination reaction product mixture having a chlorine content less than 16% by weight and preferably in the range 6–12% by weight, or by chlorinating the wax without attempting to carefully control the chlorine content of the reaction product and then subjecting the reaction product to adsorption fractionation to separate a fraction having a high content of monochlorinated wax molecules.

In the production of the oils of this invention, process variables such as the degree and temperature of chlorination, the temperature during dehydrochlorination, the type and amount of catalyst employed in the dehydrochlorination step, and the time of contact between the chlorinated wax and the catalyst during the dehydrochlorination step must be maintained within critical ranges and are preferably coordinated within these ranges in order to produce a product oil of high viscosity index, of substantially saturated structure as determined by bromine number, and exhibiting a low Conradson carbon value.

The effect of varying process conditions upon the product quality and the boundaries and significance of the particular ranges of operating conditions described and claimed herein are illustrated by the examples and by the experimental data relating to the variation of particular process conditions set forth hereinafter.

*Example 1.*—A sample of crude scale wax was chlorinated to a degree such that the unreacted wax plus the chlorinated wax produced had a chlorine content of 8% by weight. The reaction product was then cooled and sweated at room temperature to separate chlorinated wax from unreacted wax. The resultant chlorinated wax had a chlorine content of 11.7% by weight and a considerable content of dissolved wax which was removed from the reaction product with the chlorinated wax during the sweating.

A portion of this chlorinated wax was melted, mixed with 10% by weight of Florida clay, and heated to 500° F. over a period of 2 hours while stirring and then held at a temperature of 500° F. for 2 hours. The mixture was then cooled and filtered to separate the clay from the oil. The properties of the oil are set forth in the first column of Table I below. A second portion of the chlorinated wax described above was mixed with 10% by weight of Filtrol clay (a natural clay activated by acid treating and sold under the trade name of "Filtrol"), heated during agitation over a period of 2 hours to a temperature of 650° F. and held at that temperature for 20 minutes. The reaction product was cooled and filtered to separate the clay. The properties of the oil are set forth in the second column of Table I following.

TABLE I

| Feed Stock | Scale Wax | Scale Wax |
|---|---|---|
| Run Number | WT-1-263 | WT-1-261 |
| Chlorination: | | |
| Per cent Chlorine in Chlorinated Wax | 11.7 | 11.7 |
| Temperature, °F | 170–190 | 170–190 |
| Final Process Step | (1) | (2) |
| Per cent Catalyst | 10 | 10. |
| Temperature, °F | 500 | 650. |
| Time in Minutes | 120 | 20. |
| Inspection on Products: | | |
| Per cent Remaining Chlorine by Weight | Trace | Nil. |
| Viscosity at 100° F., SSU | 127.0 | 98.5. |
| Viscosity at 210° F., SSU | 43.8 | 40.8 |
| Viscosity Index | 144 | 150. |
| Bromine Number | 30 | 3. |
| Molecular Weight | 470 | 415. |
| Unsaturation, Mol. per cent | 8.8 | 7.8. |
| Pour Point, °F | +80 | +80. |
| Per cent Wax by weight | 14.8 | 16.7. |
| Flash Point, °F., Cleveland | 410 | 400. |
| Color, ASTM | 4– | 3½–. |
| Conradson Carbon, per cent | 0.11 | 0.10. |

¹ Dehydrochlorination Florida Clay.
² Dehydrochlorination and Saturation Filtrol Clay.

It will be noted that the oil produced by dehydrochlorinating at 500° F. for a much longer period of time has a substantially higher bromine number and mol per cent unsaturation based on one double bond per molecule than does the oil produced by dehydrochlorinating at 65° F. for a shorter period of time.

The viscosity indices of both oils are high, the oil produced by dehydrochlorinating at 650° F. being somewhat superior in this respect.

As might be expected from the difference in degree of saturation of the two oils, the oil produced by dehydrochlorinating at 650° F. was markedly superior in respect to oxidation stability.

The scale wax employed as the starting material had an appreciable oil content; an appreciable quantity of this oil made its way through the process steps and appeared in the product oils. The small difference in Conradson carbon values of the two samples is believed to be due to this material.

*Example 2.*—Two oils designated in the following Table II as S-1 and S-23 were prepared by chlorinating petroleum wax and dehydrochlorinating the chlorinated wax under different conditions. Oil S-1 was prepared by chlorinating petroleum wax to a chlorine content of 25% by weight on basis of reaction product. The chlorinated wax was dehydrochlorinated at 600° F.

Oil S-23 was prepared by chlorinating petroleum wax to a chlorine content of 8% by weight based on the reaction product, dehydrochlorinating at 600° F. and dewaxing. The chlorinated wax molecules contained in the reaction product were predominantly monochlorinated molecules.

The catalyst employed in the dehydrochlorination step in producing both of the oils was Filtrol clay. The properties of these oils are summarized in the following Table II:

TABLE II

| Oil Designation | S-1 | S-10¹ | S-23 |
|---|---|---|---|
| Viscosity at 100° F., SSU | 2260 | 1138 | 246 |
| Viscosity at 210° F., SSU | 144 | 97.8 | 52.8 |
| Viscosity Index | 98 | 100 | 127 |
| Carbon Residue, per cent | 2.07 | 1.56 | 0.40 |
| Neutralization No | 0.04 | | |
| Pour Point, °F | +20 | +30 | +10 |
| Flash, °F. Cleveland | 450 | | 440 |

¹ S-1 after clay treatment.

It will be noted that oil S-23 produced by chlorinating the petroleum wax to a much lower chlorine content is markedly superior to oil S-1 in respect to viscosity index and in respect to carbon residue.

It will be noted also that oil S-10 produced by subjecting oil S-1 to conventional clay treatment is somewhat superior to S-1 but is markedly inferior to S-23.

Oil S-1 was compared with a highly refined commercial hydrocarbon oil in test runs in a Wisconsin engine operating at 550° F. cylinder temperature and 220° F. oil temperature. Oil S-1 was noticeably inferior to the commercial oil in respect to piston deposit number and percent of oil ring clogging.

Oil S-23 was compared with a highly refined commercial lubricating oil in test runs in a Lauson engine operated at a cylinder temperature of 375° F. and an oil temperature of 300° F. At the end of 60 hours piston deposits for both oils were low and no oil ring clogging was observed with either oil.

*Example 3*—The oil described in Table III below demonstrates that oils of high quality may be prepared from low value waxy refinery streams by the process of this invention.

A distillation cut from slack wax containing 27.3% oil and having a molecular weight of 490 was chlorinated to 9.0% by weight based on reaction mixture. The chlorinated charge was mixed with 15% by weight of Filtrol clay, and the mixture was heated, with agitation, to 640° F. during a period of about two hours. The temperature of the mixture was held at 640° F. for one hour after which the dehydrochlorinated mixture was cooled and filtered free from clay. The stock was then dewaxed at −10° F. The dewaxing solvent was removed by distillation and the oil was vacuum distilled to 415° F. pot temperature at 2 mm. pressure. The following inspections were obtained on the oil:

TABLE III

| | |
|---|---|
| Viscosity at 100° F. SSU | 281.1 |
| Viscosity at 210° F. SSU | 53.4 |
| Viscosity index | 114 |
| Molecular weight | 500 |
| Bromine number | 5 |
| Flash point, °F. Cleveland | 460 |
| Pour Point °F | −5 |
| Conradson carbon, per cent | 0.26 |
| Per cent chlorine by weight | 0.14 |

The viscosities shown by this oil at low temperature are higher than those which would be obtained if a deoiled wax were used as a charging stock.

The oils of this invention may be prepared from petroleum waxes in any of the many forms in which they are separated during the course of commercial refining. The feed to the process of the invention may be slack wax, or crude scale wax, or a highly refined wax. The oils produced by the process of the invention appear to be the same oils irrespective of the condition of the wax which is charged to the process. However, the oils produced from waxes having a high oil content such as a crude slack wax, will differ from the oils produced from a deoiled and refined wax because the oil contained in the slack wax passes through the process steps and is somewhat degraded during this passage. A small amount of this degraded material in the product oil causes a significant increase in the rate at which engine deposits accumulate during use of the oil as a lubricant.

It has been found that the yields of oil produced by the process of this invention under identical operating conditions, are substantially higher if waxes of relatively high molecular weight are charged to the process. If a wax having a molecular weight below about 350 is charged to the process, the yield of oil which is obtained is appreciably lower than if waxes of molecular weights of 350 and above are charged to the process.

The effect of molecular weight of the charging stock is clearly shown by the runs summarized in Table IV below. A wax containing approximately 21 carbon atoms in each molecule was used in the first run (WT-99-3). A commercially available scale wax having about 29 carbon atoms to the molecule was used in the second run (WT-111-11). Both waxes were chlorinated to the same degree in the sense that the same average number of chlorine atoms were introduced into each charge molecule, namely, 1.1 chlorine atoms per molecule. Batch dehydrochlorinations were conducted under conditions adapted to produce substantially saturated oils. Low pour oils were obtained from the dehydrochlorination product by dewaxing at −50° F. in each case. Light ends were vacuum distilled to raise the viscosity of the bottoms into the lubricating oil range.

The properties of the two oils and the yields obtained from the waxes of two different molecular weights are shown in the following Table IV:

TABLE IV

Effect of charging stock molecular weight

| Run | WT-99-3 | WT-111-11 |
|---|---|---|
| Feed Stock: | | |
| Molecular Weight | 300 | 410 |
| Melting Point, °F | 94 | 124-126 |
| Per Cent oil by weight | 2.6 | 4.7 |
| Chlorination: | | |
| Temperature, °F | 190 | 190 |
| Weight Per Cent Chlorine in Product | 11.9 | 8.7 |
| Dehydrochlorination: | | |
| Filtrol Clay | 15 | 15 |
| Temperature, °F | 550-580 | 550-590 |
| Time in Minutes | 30 | 30 |
| Dewaxing Solvent | (1) | (1) |
| Temperature, °F | −50 | −50 |
| Inspections on Oil: | | |
| Pour Point, °F | −45 | 2 −45 |
| Viscosity at −30° F., SSU | 11,250 | 14,378 |
| Viscosity at 0° F., SSU | | 2,781 |
| Viscosity at 100° F., SSU | 110.4 | 119.5 |
| Viscosity at 130° F., SSU | | 74.2 |
| Viscosity at 210° F., SSU | 41.0 | 42.1 |
| Viscosity Index | 123 | 129 |
| Vapor Pressure at 380° F., mm. Hg | | 4.8 |
| Yields (weight percent of Charge Wax): | | |
| Inspected Oil | 23.9 | 31.3 |
| Waxy Residue | 42.0 | 54.7 |
| Light Stock, Coke, Hydrogen | 33.96 | 13.97 |

1 Methyl Isobutyl Ketone.
2 Stable pour.

It is clear from the data presented in the above Table IV that the oil yields from waxes of higher molecular weight are substantially greater than from those of low molecular weight. Exploration of the relationship between molecular weight of the charge wax and ultimate yield of oil by the process of this invention indicates that charge waxes having at least 25 carbon atoms per molecule or an average molecular weight above about 350 should preferably be selected for treatment by the process.

The chlorination step of the process is conducted by heating the wax to a temperature sufficient to melt it and then bubbling chlorine gas through the molten wax at a moderately elevated temperature while vigorously agitating the molten wax.

The temperature at which the chlorination is effected is ordinarily in the range about 100-250° F. If higher temperatures are used, for example, a temperature of 250° F., a tendency toward decomposition of the chlorparaffins formed during the chlorination step is observed. Decomposition of the chlorinated wax has an adverse effect on oil yields and an increase in the number of polychlorinated wax molecules in the chlorination reaction product has an adverse effect on the quality of the oil produced. It should be noted that if the wax charge is substantially free of dissolved oxygen or air and if the chlorination is conducted in the absence of air, temperatures up to about 300° F. may be employed.

A chlorinated wax consisting predominantly of monochlorinated wax molecules suitable for charging to the dehydrochlorination step of the process can be prepared by limiting the amount of chlorine introduced into the wax during the chlorination step so that the chlorinated wax produced has a chlorine content less than 16% and preferably in the range about 6-12% by weight based on the whole chlorination reaction product mixture.

A recently developed method for separating monochlorinated wax molecules from polychlorinated wax molecules has been employed to separate a fraction consisting predominantly of monochlorinated wax molecules from the chlorinated wax. This method is effective whether or not the chlorination is controlled so as to produce a reaction product having a maximum chlorine content of 16%. According to this method, the reaction product of the chlorination step is contacted with a solid adsorbent selective for polychlorinated wax such as silica gel, silica-alumina gel, or alumina gel. The polychlorinated waxes are selectively adsorbed by the gel and the first effluent from the contact of the reaction mixture with the adsorbent consists essentially of monochlorinated waxes. After a sample of the chlorination reaction product has been charged to the solid adsorbent, the adsorbent may be eluted with a paraffinic hydrocarbon liquid such as isopentane to elute monochlorinated waxes which are then dehydrochlorinated. When the removal of the monochlorinated wax from the adsorbent is complete, benzene is employed to desorb the polychlorinated waxes from the adsorbent. The adsorbent may be conditioned for reuse by washing the benzene from the adsorbent with a hot paraffinic hydrocarbon such as isopentane.

A sample of crude scale wax was chlorinated to a chlorine content of 8% by weight of the reaction mixture and chlorinated wax was then separated from the reaction mixture by sweating. The resulting chlorinated wax had a chlorine content of 11.7% by weight. The chlorinated wax was then separated by contact with silica gel into a wax fraction, a monochlorinated wax fraction, and a polychlorinated wax fraction. The wax fraction amounted to 13% by weight of the reaction mixture, the monochlorinated wax fraction amounted to 50% by weight of the reaction mixture, and the polychlorinated wax fraction amounted to 34% by weight of the reaction mixture. Thus, upward of sixty per cent of the chlorinated wax molecules was monochlorinated wax. In a second experiment a refined white paraffin wax having a molecular weight in the range 480–500 was chlorinated to a chlorine content of 20%. The reaction mixture was separated by contacting with silica gel and a wax fraction amounting to 3% of the charge was recovered, a monochlorinated wax fraction amounting to 13.5% of the charge was recovered, and a polychlorinated wax fraction amounting to 80% of the charge was recovered. The monochlorinated wax and the polychlorinated wax fractions separated in the first of the above experiments were separately dehydrochlorinated under identical conditions. 15% by weight of dried Filtrol clay was added to the charge in each case. The mixtures were stirred and heated to 600° F. over a period of 75 minutes and held at this temperature for 30 minutes. The reaction vessel and stock were then cooled rapidly and the stock was filtered at 150° F. to separate the catalyst. Both products were vacuum distilled to 390° F. pot temperature at 5 mm. pressure. Samples of the two dehydrochlorinated stocks were solvent dewaxed at −10° F. to separate a waxy oil and the filtrates were again "dewaxed" at −50° F. to separate a high pour oil and a low pour oil in each case. Inspections on these oils are shown in the following Table V:

atoms in each molecule. The monochlorinated oils are markedly superior to the polychlorinated oils in respect to Ramsbottom carbon and Conradson carbon values. Further, the monochlorinated oils have lower bromine numbers and are superior in respect to stability.

The monochlorinated oils and the polychlorinated oils described in the above Table V were fractionated by silica gel adsorption into several cuts which are subjected to spectrographic analysis by means of infrared and ultraviolet techniques. These inspections indicated that the whole dehydrochlorinated stock obtained from the monochlorinated wax contained 80% by weight of isoparaffins, 11.3% by weight of mononuclear compounds, and 8.7% of polynuclear compounds; while the whole dehydrochlorinated stock obtained from the polychlorinated wax contained 48% of isoparaffins, 34% of mononuclear compounds and 18% of polynuclear compounds. Ramsbottom carbon values for the isoparaffinic cut, the mononuclear compound cut and the polynuclear compound cut were .01, .31, and 1.57, respectively. From the foregoing it is clear that a high content of polychlorinated wax in the chlorinated wax produced in the chlorination step of the process of this invention is to be avoided. It may be avoided either by controlling the chlorination to keep the chlorine content of the chlorinated wax below 16% by weight and preferably in the range 6–12% by weight or the reaction product of the chlorination step may be separated by selective adsorption to separate a monochlorinated wax fraction which is charged to the dehydrochlorination step of the process. It is also clear that the oil produced in the dehydrochlorination step may desirably be separated by adsorption employing an adsorbent of the silica gel type such as silica gel itself or silica-

TABLE V

| Stock | "Monochlor" oils | | | | "Polychlor" Oils | | | |
|---|---|---|---|---|---|---|---|---|
| | Whole Dehydro-chlorinated Stock I | Waxy A | High Pour Oil B | Low Pour Oil C | Whole Dehydro-chlorinated Stock II | Waxy 1 | High Pour Oil 2 | Low Pour Oil 3 |
| Inspections: | | | | | | | | |
| Viscosity at −30° F., SSU | | | | 7,210 | | | | 33,250 |
| Viscosity at 100° F., SSU | 108.4 | 125.3 | 115.5 | 91.9 | 231.9 | 425.0 | 280.0 | 181 |
| Viscosity at 210° F., SSU | 42.1 | 45.4 | 43.2 | 39.8 | 52.4 | 71.6 | 57.5 | 47.5 |
| Viscosity Index | 151 | 160 | 153 | 143 | 130 | 134 | 133 | 127 |
| Molecular Weight | 440 | 500 | 458 | 345 | 479 | 590 | 456 | 393 |
| Bromine Number | 4 | 2 | 5 | 7 | 7 | 3 | 7 | 11 |
| Mol. Percent Unsaturation | 11 | 6 | 14 | 15 | 21 | 11 | 20 | 27 |
| Ramsbottom Carbon | 0.04 | | | 0.05 | 0.29 | | | 0.23 |
| (Conradson Carbon) | 0.00 | | | 0.00 | 0.26 | | | 0.18 |
| Pour Point, °F | 65 | 88 to 90 | 23 | −40 | 35 | 73 | 19.5 | −40 |
| Color, ASTM | 2½ | 2 | 2½ | 3 | 3½ | 3½ | 3½ | 4 |
| Gravity, °API | 38.5 | 41.4 | 34.8 | 38.1 | 32.0 | 32.5 | 31.3 | 31.9 |
| Percent Oil by weight | | 8.0 | | | | 7.98 | | |
| Vapor Pressure at 380°F., mm. Hg | | | | 4.4 | | | | 3.5 |
| Percent Chlorine by weight | 0.05 | | | | 0.29 | | | |
| Carbon Atoms (Ave.) | 31 | 37 | 32 | 24 | 34 | 42 | 32 | 28 |
| End Carbon Atoms (Ave.) | 4.4 | ¹ 3.85 | 4.57 | 4.17 | 4.85 | ¹ 4.37 | 4.92 | 4.5 |
| Percent Aromatics by weight | ² 20.0 | 7 | 12.5 | ² 23.5 | ³ 52.0 | 35 | 45 | ² 54.5 |
| Yields: | | | | | | | | |
| Weight Percent of Isomerized Stock ³ | 100.0 | 31.6 | 21.9 | 46.5 | 100.0 | 14.6 | 18.4 | 67.0 |

¹ Corrected for oil present.
² By silica gel fractionation; the remaining oils were compared by infrared spectra.
³ Basis 100 lb. scale wax yields 35 pounds of monochlorinated wax from which 25.7 pounds of whole dehydrochlorinated stock I is obtained and 25.9 pounds of polychlorinated wax from which 18.0 pounds of whole dehydrochlorinated stock II is obtained.

The monochlorinated wax from which the monochlorinated oils in the above table were produced contained 1.0 chlorine atoms per molecule while the polychlorinated wax from which the polychlorinated oils in the above table were produced contained an average of 2.2 chlorine atoms in each molecule. The monochlorinated oils are markedly superior to the polychlorinated oils in respect to Ramsbottom carbon and Conradson carbon values. Further, the monochlorinated oils have lower bromine numbers and are superior in respect to stability.

alumina gel, or alumina gel, to produce a highly isoparaffinic oil having an extremely low Ramsbottom carbon value.

The dehydrochlorination step of the process of this invention is conducted in the presence of a silica-alumina catalyst and at an elevated temperature in excess of 550° F. but below the temperature at which appreciable cracking occurs, preferably in the range 575-725° F.

Experiments were conducted in which a whole chlorinated wax was dehydrochlorinated in the presence of 5% by weight of Filtrol clay at temperatures of 500, 600, 650, 700, and 740° F. At 500° F. the dehydrochlorinated product had a high bromine number which was only slightly reduced by holding the oil in contact with the catalyst at that temperature for a long period of time. At the higher temperatures the bromine number was lower and fell rapidly to a value of 3 or 4 in less than one hours' contact. At 740° F. continuous cracking at a low rate was observed in the reactor indicating that a maximum temperature between about 700 and 740° F. should be maintained in order to avoid cracking and obtain high oil yields.

A number of catalysts was tested for effectiveness in producing relatively saturated hydrocarbons in the dehydrochlorination step, including synthetic silica-alumina catalyst commercially produced for use in catalytic cracking, Filtrol clay (trade name for an acid-treated Montmorillinite group clay high in silica and alumina) Florida clay, dehydrated Filtrol clay, silica gel, alumina, activated charcoal, and Celite (a diatomaceous silicon dioxide). Experiments showed that silica-alumina catalysts either natural or synthetic were markedly superior to the other catalysts tested in respect to producing a saturated oil.

The dehydrochlorination step of the process was conducted in a series of parallel experiments in which only the per cent of catalyst added to the chlorinated wax was varied. During these tests the weight per cent of catalyst added to the reaction mixture was varied from 0 to 20% by weight. The experiment showed that at least 5% by weight of catalyst should be employed in order to produce a saturated oil in a reasonable period of time and that the amount should preferably be in the range 8 to 13% by weight. No disadvantage attended the employment of larger amounts of catalyst other than the process burden of filtering and handling large volumes of solid material.

When the chlorination step of the process is conducted in the manner indicated above to produce predominantly monochlorinated wax molecules, the reaction product of the chlorination step contains substantial amounts of unreacted wax which must be removed either from the reaction product of the chlorination step or from the final oil in order to obtain oils of low pour point. Accordingly, a dewaxing step is included in the process; it may be conducted immediately following the chlorination step or immediately following the dehydrochlorination step. It is preferred to dewax the final oil produced in the dehydrochlorination step since the formation of minor amounts of micro-crystalline wax is sometimes observed during the dehydrochlorination. The dewaxing is accomplished by a conventional solvent dewaxing using such solvents as methyl ethyl ketone-benzene, propane, or methyl isobutyl ketone.

The time of contact between the catalyst and the chlorinated wax in the dehydrocalorination step necessary to produce a substantially saturated oil varies inversely with both the temperature and with the amount and activity of the catalyst employed. In a batch dehydrochlorination at 700° F. using 8-12% by weight of Filtrol clay, twenty to thirty minutes contact is suitable. In a continuous dehydrochlorination step shorter contact times suffice. In the practice of the process the time is preferably treated as a dependent variable and simple tests permit its adjustment after other conditions have been established to produce a product oil of 0 to 4 bromine number. Longer contact times than those necessary to produce the desired degree of saturation should be avoided as excessively long contact times increase the production of undesired heavy and light side reaction products.

The oils of this invention, as exemplified by samples WT-99-3 and WT-111-11 described in Table IV above have properties which make them very valuable as lubricants for engines operated in very cold climates. The oils show viscosities above 40 SSU at 210° F. and at —30° F. their viscosities are substantially below 18,000 SSU, a common specification for an oil designed for use at very low temperatures. Engine consumption of these oils as determined in comparative tests was found to be lower than the engine consumption for a 10/10W refined Pennsylvania oil. Oxidation stability of these oils was determined at high temperatures in a Chevrolet engine. Oxidation of an oil produces acids which attack the metal surfaces of the engine so a measure of this property may be made by determining the loss in the connecting rod bearing weight, a common value for a finished lubricating oil is 40-50 mg. A loss in weight for oils produced by the process of this invention was 4 mg. The oils of this invention have a further valuable characteristic which renders them particularly suitable for use at extremely low temperature conditions. This is illustrated by the appended drawing which shows a graphical comparison of oil WT-99-3 and WT-111-11, described in Table IV above, with a theoretical oil having a viscosity of 40 SSU at 210° F., a viscosity of 18,000 SSU at —30° F. and a straight line viscosity-temperature relationship. Curves 2 and 3 of the graph representing the oils of this invention are concave when viewed from the temperature axis and show smaller viscosity increases as temperature is lowered than those shown by the theoretical oil. Both Curve 2 and Curve 3 drop below Curve 1 as the temperature is lowered below 0° F. The downward turn of these curves is important since it represents large actual differences in viscosity at —30° F. It also means that relatively higher viscosities above room temperature may be had while meeting the low temperature viscosity requirement.

A new hydrocarbon lubricating oil and a process for producing it have been described above and illustrated in the foregoing examples. Various modifications of the process may be made by those skilled in the art without departing from the scope of the appended claims.

We claim:

1. A process for producing lubricating oil from petroleum wax which comprises chlorinating petroleum wax at a temperature below 300° F. to a degree such that the reaction product has a chlorine content less than 16% by weight, mixing the resultant chlorinated wax with at least 5% by weight of a silica alumina catalyst, heating the mixture of chlorinated wax and catalyst to a temperature in the range 600-725° F., maintaining the mixture of chlorinated wax and catalyst at said temperature for a time sufficient to effect substantially complete removal of the chlorine from the chlorinated wax and to produce a substantially saturated oil.

2. A process for the production of lubricating oil from petroleum wax which comprises chlorinating a petroleum wax at a temperature of 100–250° F. to produce a reaction product having a chlorine content in the range 6–12% by weight, dehydrochlorinating the resultant chlorinated wax by mixing the chlorinated wax with at least 5% by weight of a silica alumina catalyst, heating the mixture of chlorinated wax and catalyst to a temperature in the range 600–725° F., maintaining the mixture of chlorinated wax and catalyst within said temperature range for a time sufficient to substantially completely remove the chlorine from the chlorinated wax and to produce a substantially saturated oil, separating the catalyst from the oil and dewaxing the oil to remove unreacted wax.

3. A process for producing lubricating oil from wax which comprises melting the wax and heating it to a temperature in the range 100–250° F., passing chlorine gas through the hot wax in amount sufficient only to convert a major proportion of the wax to monochlorinated wax, mixing the resultant chlorinated wax with 8–13% by weight of a silica alumina catalyst, heating the mixture of chlorinated wax and catalyst to a temperature in the range 600–725° F., and maintaining the chlorinated wax and catalyst at a temperature in said range for a time sufficient to substantially completely remove the chlorine from the chlorinated wax and to produce a substantially saturated oil, separating the catalyst from the oil, and dewaxing the oil to separate unreacted wax from the product oil.

4. A process for the production of a highly isoparaffinic lubricating oil from petroleum wax which comprises contacting a chlorinated petroleum wax consisting predominantly of monochlorinated wax molecules with a silica-alumina catalyst at a temperature in the range 600–725° F. for a time sufficient to substantially completely remove the chlorine from the chlorinated wax by dehydrochlorination and contacting the reaction product of the dehydrochlorination step with a solid adsorbent selected from the group consisting of silica gel, silica-alumina gel and alumina gel to separate an adsorbate comprising aromatic hydrocarbons and a percolate consisting essentially of isoparaffinic hydrocarbons.

WALLACE M. THAW.
HAROLD R. STEWART.

REFERENCES CITED

The following references are of record in the file of this patent:

UNITED STATES PATENTS

| Number    | Name          | Date          |
|-----------|---------------|---------------|
| 2,094,593 | Gardiner et al. | Oct. 5, 1939 |
| 2,384,311 | Kearby        | Sept. 4, 1945 |
| 2,401,636 | Haensel et al. | June 4, 1946 |